(12) United States Patent
Matsunobu et al.

(10) Patent No.: US 6,528,920 B2
(45) Date of Patent: *Mar. 4, 2003

(54) PERMANENT MAGNET ROTARY MACHINE AND ELECTRIC VEHICLE USING THE SAME

(75) Inventors: Yutaka Matsunobu, Hitachi (JP); Fumio Tajima, Juou-machi (JP); Shouichi Kawamata, Hitachi (JP); Suetaro Shibukawa, Hitachinaka (JP); Osamu Koizumi, Ibaraki-machi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/805,572

(22) Filed: Mar. 14, 2001

(65) Prior Publication Data

US 2001/0030480 A1 Oct. 18, 2001

Related U.S. Application Data

(63) Continuation of application No. 09/161,726, filed on Sep. 29, 1998, now Pat. No. 6,242,837.

(30) Foreign Application Priority Data

Sep. 29, 1997 (JP) ............................................... 9-263242

(51) Int. Cl.$^7$ .......................... H02K 21/12; H02K 21/14
(52) U.S. Cl. ............................ 310/156.57; 310/156.56; 310/216
(58) Field of Search ................................ 310/216, 261, 310/162–165, 156.53, 156.54, 156.55, 156.56, 156.57; 29/596–598

(56) References Cited

U.S. PATENT DOCUMENTS 3,602,749 A * 8/1971 Estars ......................... 310/154
4,144,469 A * 3/1979 Miyashita et al. ........... 310/156
4,322,648 A * 3/1982 Ray et al. .................... 310/156
4,403,161 A * 9/1983 Miyashita et al. ........... 310/156
4,672,253 A * 6/1987 Tajima et al. ................ 310/269
5,258,678 A * 11/1993 Futami ......................... 310/156
5,363,004 A * 11/1994 Futami et al. ............... 310/156
5,682,072 A * 10/1997 Takahashi .................... 310/156
5,684,352 A * 11/1997 Mita et al. ................... 310/156
5,783,890 A * 7/1998 Mulgrave .................... 310/156
5,857,762 A * 1/1999 Schwaller .................... 310/156
5,886,440 A * 3/1999 Hasebe et al. ............... 310/156
5,886,441 A * 3/1999 Uchida et al. ............... 310/156
5,990,592 A * 11/1999 Miura et al. ................. 310/156
6,031,311 A * 2/2000 Lee ............................. 310/156
6,034,460 A * 3/2000 Tajima et al. ................ 310/156
6,049,153 A * 4/2000 Nishiyama et al. ......... 310/156
6,242,837 B1 * 6/2001 Matsunobu et al. ........ 310/216

FOREIGN PATENT DOCUMENTS

| JP | 3-45140 | 2/1991 |
| JP | 5-103453 | 4/1993 |
| JP | 05-304737 | 11/1993 |
| JP | 07-213040 | 8/1995 |
| JP | 07-322588 | 12/1995 |
| JP | 7-336917 | 12/1995 |
| JP | 08-098488 | 4/1996 |

* cited by examiner

*Primary Examiner*—Tran Nguyen
(74) *Attorney, Agent, or Firm*—Crowell & Moring LLP

(57) ABSTRACT

At least one groove and two grooves extending toward an axial direction of a rotor and is provided on an outer periphery of a rotor iron core or at least one hole is provided in the rotor iron core. By providing the groove and the two grooves on the outer periphery of the rotor iron core or by providing the hole in the rotor iron core, cogging torque is generated to negate the cogging torque which is generated according to the magnetic fluctuation between the magnetic field of the permanent magnets and a stator. As a result, the overall cogging toque in a permanent magnet type rotary machine is reduced.

6 Claims, 9 Drawing Sheets

PERMANENT MAGNET ROTARY MACHINE AND ELECTRIC VEHICLE USING THE SAME

This application is a continuation of application Ser. No. 09/161,726, filed Sep. 29, 1998, now U.S. Pat. No. 6,242,837.

BACKGROUND OF THE INVENTION

The present invention relates to a permanent magnet rotary machine and an electric vehicle using the permanent magnet rotary machine.

In a permanent magnet rotary machine, a "cogging torque" due to a magnetic fluctuation of a stator and a rotor causes and there is a problem the cogging torque obstacles a smooth rotation.

To improve a reduction in the cogging torque, a permanent magnet rotary machine is disclosed in Japanese patent application laid-open publication No. Hei 3-45,140, in which since a groove is provided on a permanent magnet a magnetic fluctuation component for generating a cogging torque having the same dimensional degree number to a generated cogging torque and having a reverse phase is provided on a permanent magnet magnetic field.

Further, without the permanent magnet rotary machine structure in which the magnetic fluctuation component is kept to the permanent magnet magnetic field, a permanent magnet rotary machine is disclosed, in Japanese patent application laid-open publication No. Hei 5-103,453 and Japanese patent application laid-open publication No. Hei 7-336,917, in which a fluctuation component such as a hole or a groove on a surface of a rotor iron core which is positioned at an outer periphery of a permanent magnet.

In a former Japanese patent (Japanese patent application laid-open publication No. Hei 5-103,453), a hole extending to an axial direction is provided at a position of the rotor iron core which corresponds to electrical angle s of 60 degree and 120 degree of the rotor iron core. Namely, a torque of a portion, which is a peak position of a torque ripple, is made small and as a whole the torque is formed uniformly, as a result a reduction in the vibration and a reduction in noises are improved.

In a latter Japanese patent (Japanese patent application laid-open publication No. Hei 7-336,917), in a rotor iron core in which a convex portion of an arc shape permanent magnet is directed to a rotation center, a slit for extending to a radial direction is formed at a portion which is positioned at a side of a convex portion of the permanent magnet. By the provision of the slit, the magnetic resistance of the slit formed on the portion is increased, the magnetic flux passing to the slit formed on the portion is reduced, and further the inductance of the stator windings is reduced, as a result a restraint of the torque lowering is attained.

Further, in an electric vehicle using a permanent magnet rotary machine, a smooth deceleration and a smooth standstill of the electric vehicle are difficult by a cause of the cogging torque generated in the permanent magnet rotary machine. Accordingly, in the electric vehicle it is necessary to provide a mechanism for cutting a connection between a rotating shaft of the permanent magnet rotary machine being a power source and a wheel or a wheel drive shaft during a deceleration time and during immediately before the standstill of the electric vehicle and a mechanism for absorbing the vibration.

In the technique shown in Japanese patent application laid-open publication No. Hei 3-45,140, the cogging torque can be reduced but since the groove is provided on the permanent magnet itself, following problems cause.

First of all, as a first problem, when the permanent magnet is processed, the cracks and the crevices are easily caused according the material and then the mechanical strength lowers. As a second problem, since the groove is formed on the surface of the permanent magnet, so as to fully reduce the cogging torque, it is necessary to form a large scale groove. As a third problem, in case of a latter magnetization, namely the permanent magnet is magnetized after a formation of the rotor, when the groove is existed on the surface of the permanent magnet, since an uniform magnetization is difficult, the performance as the permanent magnet lowers.

Further, in the technique shown in Japanese patent application laid-open publication No. Hei 5-103,453, a whole torque can be uniformed, however since the hole is provided at the portions of the electrical angle of 60 degree and 120 degree, the cogging torque cannot be effectively reduced.

Further, in the technique shown in Japanese patent application laid-open publication No. Hei 7-336,917, in the permanent magnet rotary machine, the convex portion of the arc shape permanent magnet is arranged to direct for the center of the rotor, and in this structure it aims the improvement in the particular magnetic path, however the cogging torque of the rotary machine having the above stated arrangement structure is not effectively reduced.

SUMMARY OF THE INVENTION

Under the above stated circumstances, in the present invention, in which a block shape permanent magnet rotary machine, in a trapezoid shape permanent magnet rotary machine, in an arc shape permanent magnet rotary machine in which a convex portion is directed to a side of a stator, a first object of the present invention is to provide a permanent magnet rotary machine, without the provision of the groove on the surface of the permanent magnet, wherein an extremely small cogging torque can be attained.

Further, in the conventional electric vehicle using the permanent magnet rotary machine, to restrain the cogging torque by equipping the mechanism for cutting the connection between the rotation shaft and the wheel and the wheel drive shaft or the mechanism for absorbing the vibration, it invites the lowering in the efficiency, the lowering in the assembling and the increase in the cost.

Accordingly, a second object of the present invention is to provide an electric vehicle using a permanent magnet rotary machine wherein an equipment for mitigating an affect of the cogging toque to the electric vehicle can be made unnecessary and also an efficiency as the electric vehicle as a whole can be heightened.

The above stated first object of the present invention is attained by in a permanent magnet rotary machine in which permanent magnets are embedded in a rotor iron core, the permanent magnet rotary machine wherein the permanent magnet has a block shape or a trapezoid shape or an arc shape in which a convex portion directs for a side of a stator, one of a groove and a hole extending over an axial direction is provided on an outer periphery of an the iron core of a stator, thereby the cogging torque for negating the cogging torque which is generated by the magnetic fluctuation of the stator and the rotor is generated.

Namely, in a permanent magnet type rotary machine having a stator and a rotor in which permanent magnets are buried in a rotor iron core, the permanent magnet type rotary machine wherein the respective permanent magnet has one permanent magnet selected from a block shape permanent magnet, a trapezoid shape permanent magnet and an arc shape permanent magnet in which a convex portion of the permanent magnet directs for a side of the stator, and at least one groove is provided on an outer periphery of the rotor iron core toward an axial direction of a rotor to a respective magnetic pole of the respective permanent magnet, and the at least one groove is arranged between from the outer periphery of the rotor iron core and an outer side of a circumferential direction width of the respective magnetic pole of the respective permanent magnet, thereby the cogging torque for negating the cogging torque which is generated by the magnetic fluctuation of the rotor is generated.

Further, in a permanent magnet type rotary machine having a stator and a rotor in which permanent magnets are buried in a rotor iron core, the permanent magnet type rotary machine wherein the respective permanent magnet has one permanent magnet selected from a block shape permanent magnet, a trapezoid shape permanent magnet and an arc shape permanent magnet in which a convex portion of the respective permanent magnet directs for a side of the stator, and at least one hole is provided in the rotor iron core to a respective magnetic pole of the respective permanent magnet, and the at least hole is arranged between from an outer periphery of the rotor iron core and an outer side of a circumferential direction width of the respective magnetic pole of the respective permanent magnet, thereby the cogging torque for negating the cogging torque which is generated by the magnetic fluctuation of the rotor is generated.

The above stated second object of the present invention is attained in the electric vehicle by using these permanent magnet rotary machine and further by providing the permanent magnet rotary machine a wheel or a drive wheel drive shaft.

DESCRIPTION OF THE INVENTION

Hereinafter, a first embodiment of the present invention in which the present invention is adapted to a three phase, 8 poles/48 slots, 50 kW permanent magnet rotary machine will be explained referring to FIG. 1 in which one pole pair of the permanent magnet rotary machine is shown.

Figure 1:
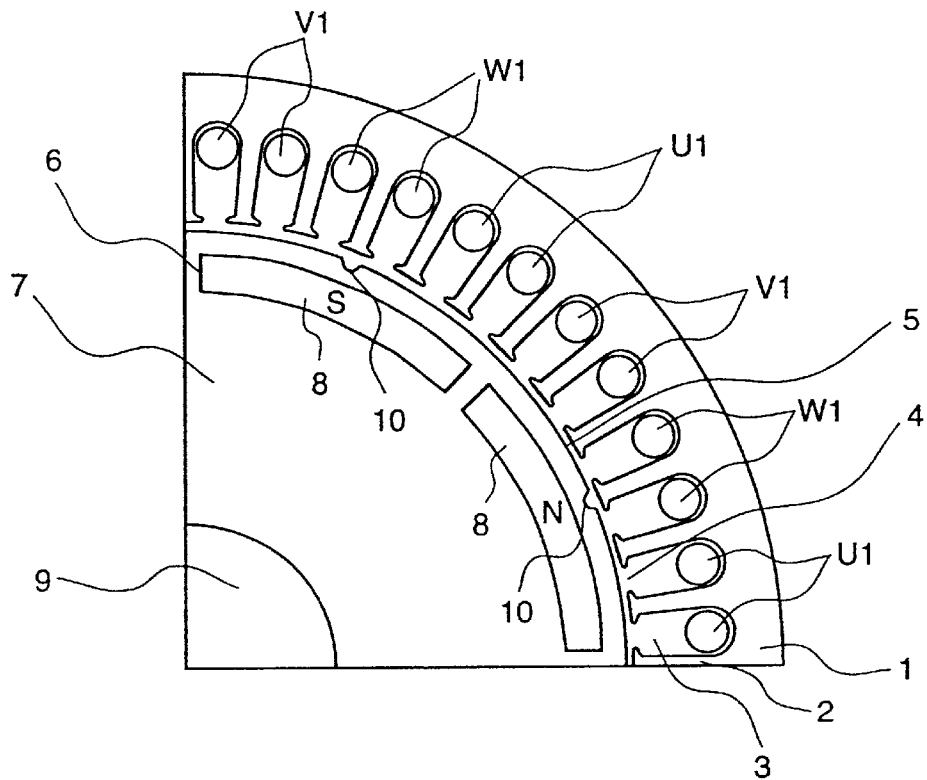
FIG. 1 is a view showing one pole pair of a permanent magnet type rotary machine of a first embodiment according to the present invention.

First of all, the permanent magnet rotary machine shown in FIG. 1, a stator 1 has the same construction of a conventional construction and is constituted by inserting and arranging a U phase stator winding U1, a V phase stator winding V1 and a W phase stator winding W1 to 48 slots 3 which are formed a substantially on a ring shape iron core 2 of the stator 1. At an inner peripheral portion of the stator iron core 2, opening portions 4 for corresponding the respective slots 3 are formed.

On the other hand, a rotor 6 is constituted by fitting into and fixing a rotor iron core 7 to a rotating shaft 9 and in a punch-out receiving portion formed to the rotor iron core 7 by inserting, embedding and assembling neodymium made 8 permanent magnets 8 which are magnetized to constitute alternatively N pole and S pole from an axial direction. The rotor 6 is arranged rotatively under a condition in which the rotor 6 has a predetermined gap 5 with the inner peripheral portion of the stator iron core 2 in an interior portion of the stator 1.

Further, the rotor iron core 7 is constituted by laminating a large number of the silicon steel sheets in which holes for forming the receiving portions for the permanent magnets 8 are formed and at a surface of the rotor iron core 7 a groove 10 for reducing the cogging torque is provided on one magnetic pole of the permanent magnet 8. This groove 10 extends toward an axial direction of the rotor iron core 7 and is arranged between an outer peripheral portion of the rotor iron core 7 and an outer face of a circumferential direction width further this groove 10 is positioned to correspond to a center of the magnetic pole of the permanent magnet 8.

Figure 2:
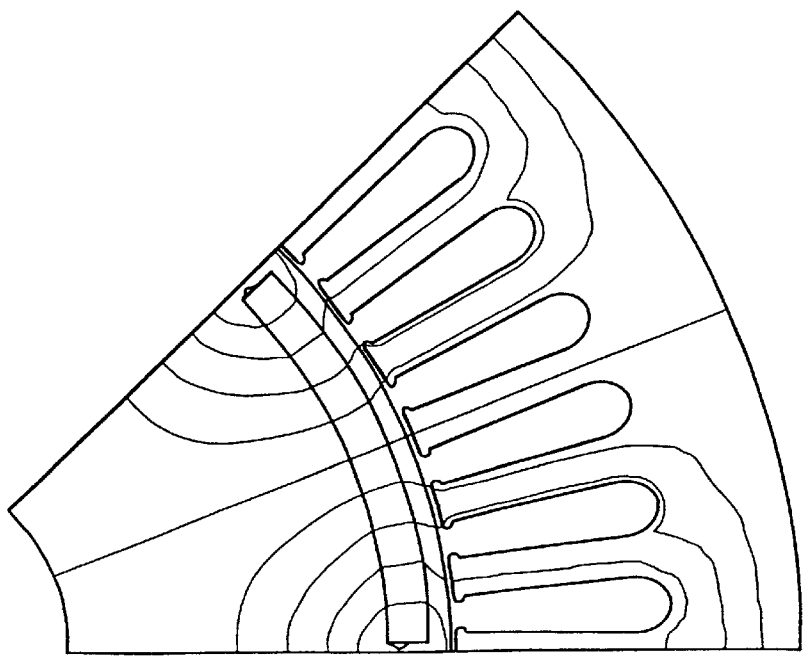
FIG. 2 is a partial analysis view showing one pole part of a magnetic field analysis of a permanent magnet rotary machine in a case of no provision of the groove according to the prior art in the comparison with the first embodiment according to the present invention.
Figure 3:
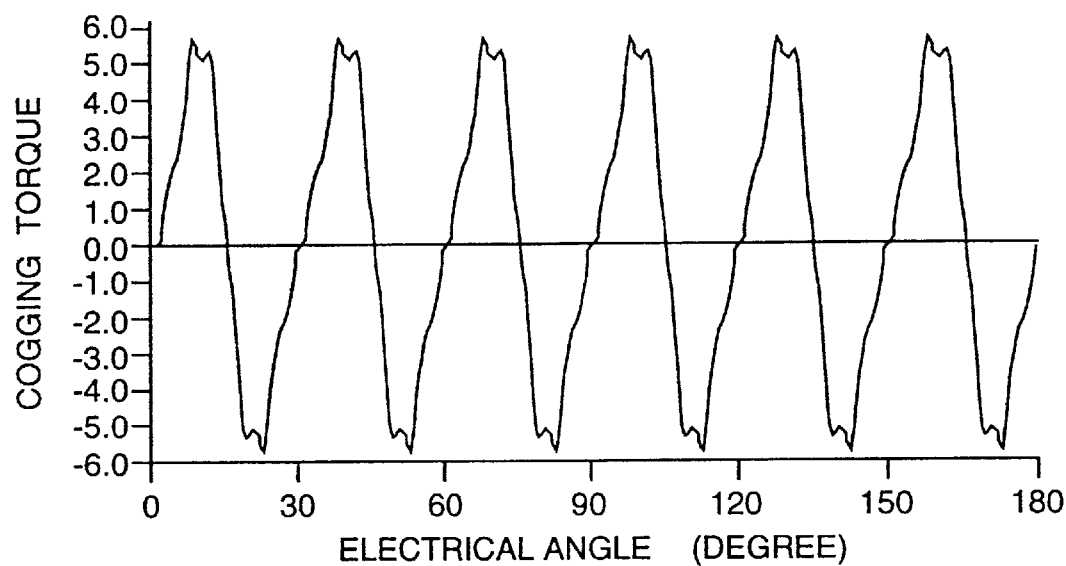
FIG. 3 is a graph showing the cogging torque in the configuration of the permanent magnet rotary machine according to the prior art shown in FIG. 2.

FIG. 2 shows a magnetic field analysis result of one magnetic pole part in the permanent magnet rotary machine in case of no provision of the groove so as to compare with an effect of an existence of the groove or a non-existence of the groove on the surface of the rotor iron core according to the prior art. FIG. 3 is the graph showing the cogging torque of one magnetic pole part (the electrical angle is 180 degree) on a configuration of the permanent magnet rotary machine according to the prior art shown in FIG. 2.

Figure 4:
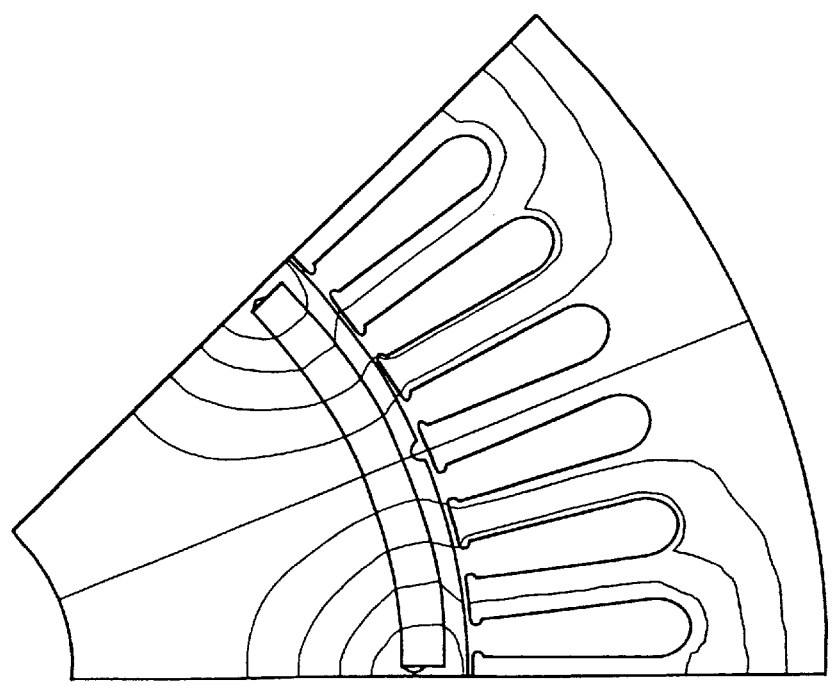
FIG. 4 is a partial analysis view showing one pole part of a magnetic field analysis of the permanent magnet rotary machine in a case of the first embodiment according to the present invention.
Figure 5:
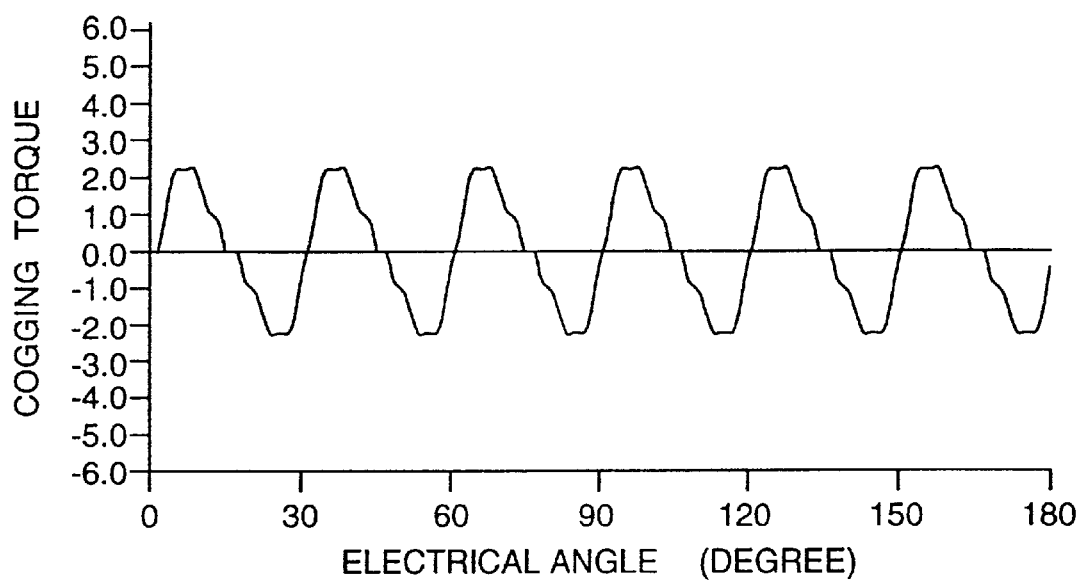
FIG. 5 is a graph showing the cogging torque in the configuration of the permanent magnet rotary machine type rotary machine according to the present invention shown in FIG. 4.

FIG. 4 shows a magnetic field analysis result of one magnetic pole part in the permanent magnet rotary machine in case of no provision of the grooves having a depth of 1 mm on the surface of the rotor iron core 7 according to the present invention. FIG. 5 is the graph showing the cogging torque of one magnetic pole part (the electrical angle is 180 degree) on a configuration in the permanent magnet rotary machine according to the present invention shown in FIG. 4.

According to the graphs shown in FIG. 3 and FIG. 5, against the cogging torque from one peck to anther peak in the case of the non-existence of the groove on the surface of the rotor iron core according to the prior art was 11.4 Nm, the cogging torque in the case of the existence of the grooves on the surface of the rotor iron core 6 according to the present invention was 4.6 Nm. As a result, by the provision of the groove according to the present invention the cogging torque can be reduced to 40% in comparison with the prior art in which the groove is not formed on the rotor core iron.

Figure 6:
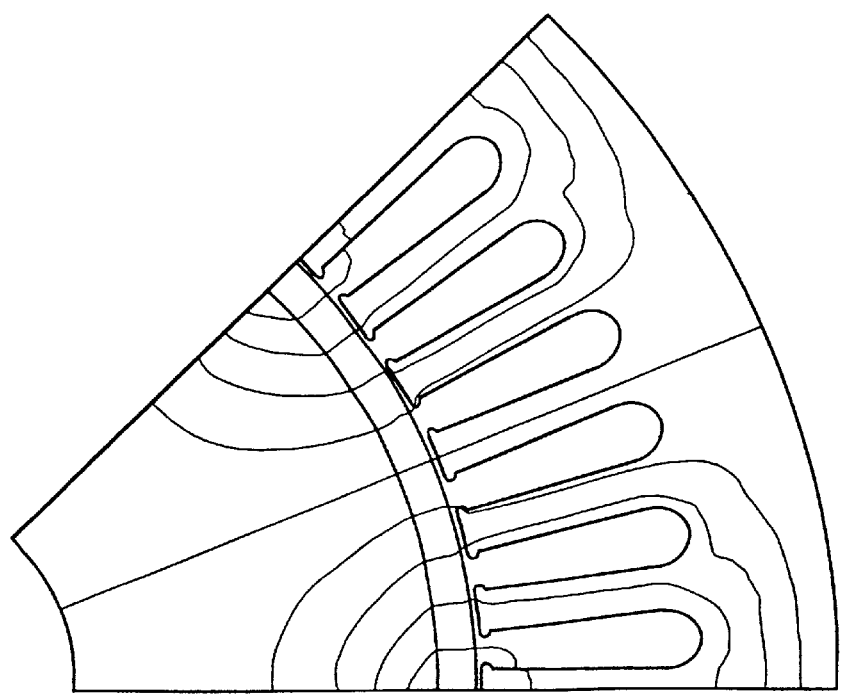
FIG. 6 is a partial analysis view showing one pole part of a magnetic field analysis of a permanent magnet rotary machine in a case of no provision of the groove according to the prior art in the comparison with the prior art.
Figure 7:
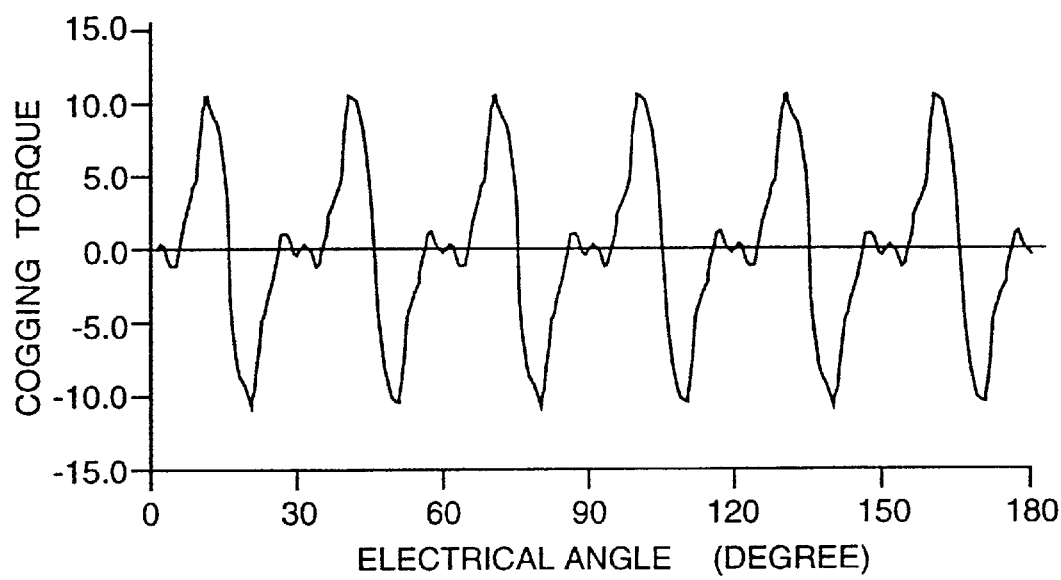
FIG. 7 is a graph showing the cogging torque in the configuration of the permanent magnet rotary machine according to the prior art shown in FIG. 6.

On the other hand, FIG. 6 shows a magnetic field analysis result of one magnetic pole part in the permanent magnet rotary machine in case of the non-existence of the groove so as to compare with an effect of an existence of the grooves and a non-existence of the groove according to the prior art. FIG. 7 is the graph showing the cogging torque of one magnetic pole part (the electrical angle is 180 degree) on a configuration according to the prior art shown in FIG. 6.

Figure 8:
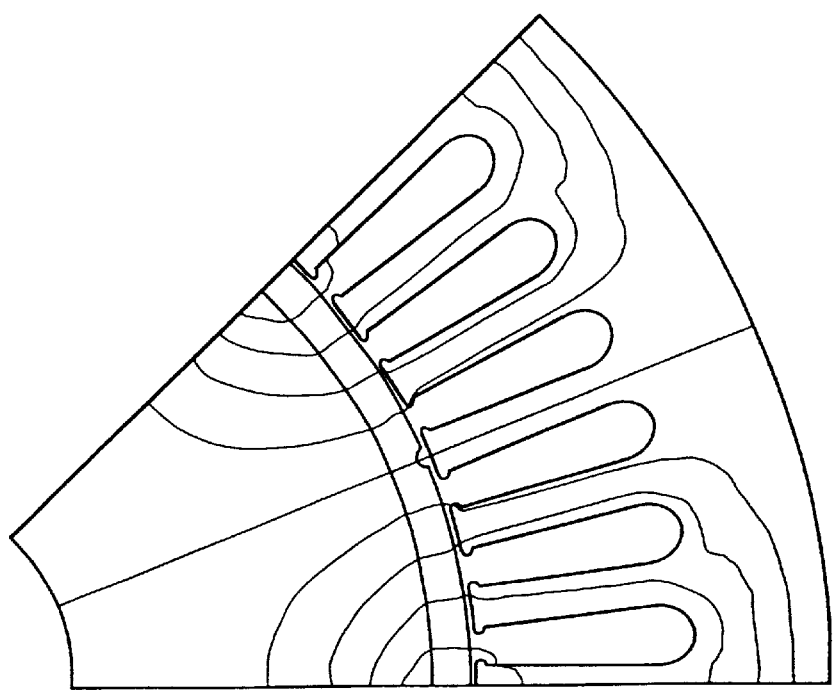
FIG. 8 is a partial analysis view showing one pole part of a magnetic field analysis of a permanent magnet rotary machine according to the prior art.
Figure 9:
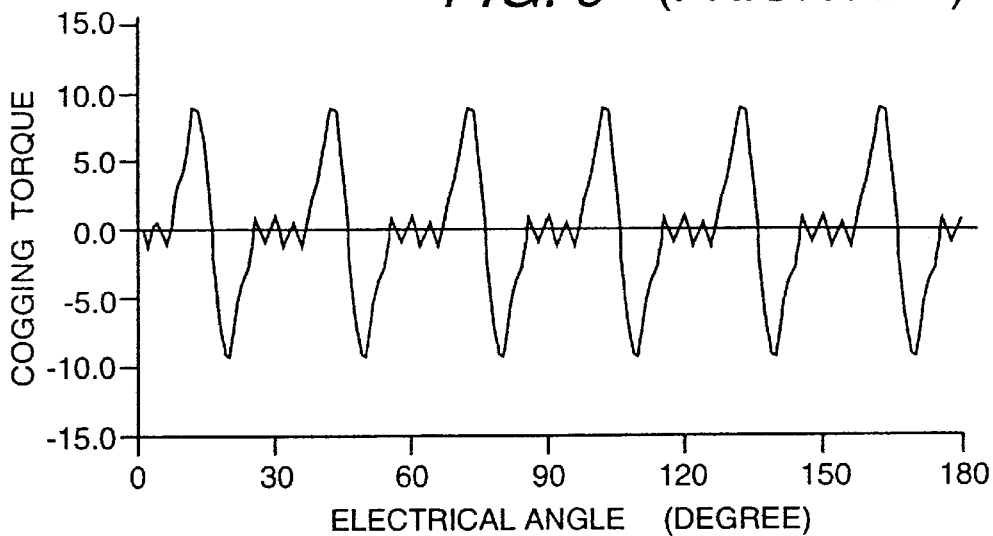
FIG. 9 is a graph showing the cogging torque in the configuration of the permanent magnet rotary machine according to the prior art shown in FIG. 8.

FIG. 8 shows a magnetic field analysis result of one magnetic pole part in the permanent magnet rotary machine in case of no provision of the groove having a depth of 1 mm on the surface of the rotor iron core according to the prior art. FIG. 9 is the graph showing the cogging torque of one magnetic pole part (the electrical angle is 180 degree) on a configuration according to the prior art shown in FIG. 8.

According to the graphs shown in FIG. 7 and FIG. 9, against the cogging torque from one peck to anther peak in the case of the non-existence of the groove on the surface of the rotor iron core according to the prior art was 21.6 Nm, the cogging torque in the case of the existence of the groove on the surface of the rotor iron core according to the prior art was 18.5 Nm. As a result, by the provision of the groove the cogging torque can be reduced to 85%.

Figure 10:
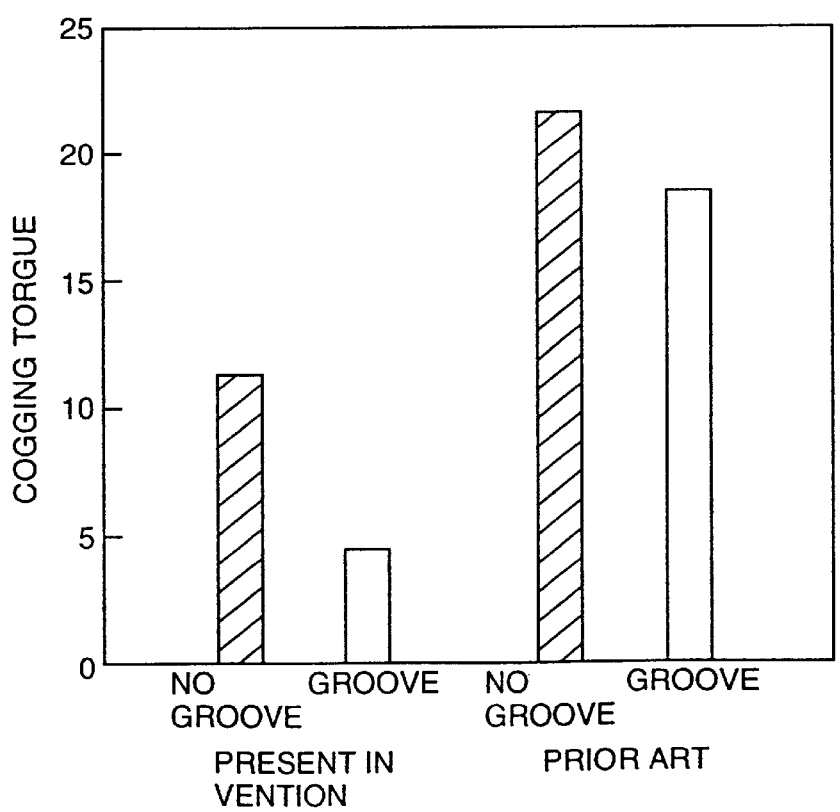
FIG. 10 is a graph showing the effect of the existence and the non-existence of the grooves according to the first embodiment according to the present invention and the effect of the existence and the non-existence of the groove the prior art.

FIG. 10 is the graph showing a change of value of the cogging torque according to the existence of the groove and the non-existence of the groove according to the present invention and a change of the value of the cogging torque according to the existence of the groove and the non-existence of the groove according to the prior art.

Regardless the provision of the groove having the substantially same depth, in comparison with the case in which the groove is provided on the surface of the permanent magnet in the permanent magnet rotary machine according to the prior art, the case in which the groove are provided on the surface of the rotor iron core in the permanent magnet rotary machine according to the present invention can be reduced greatly the cogging torque.

This is derived from that the bigger change in the magnetic energy according to the existence or the non-existence of the groove in the permanent magnet in the permanent magnet rotary machine according to the prior art than the change in the magnetic energy according to the existence or the non-existence of the rotor iron core 6 in the permanent magnet rotary machine according to the present invention.

In the present invention and the prior art, to make the substantial same cogging torque, in the prior art it is necessary to make deep the groove on the surface of the permanent magnet, as a result in addition to the difficulties on the above stated manufacture and the mechanical strength, a wind loss in the permanent magnet rotary machine increase and the efficiency lowers.

According to the present invention, since the construction is that the groove is provided on the surface of the stator iron core 6, during the punching-out working of the laminated silicon steel sheets, it is to use merely the die providing the grooves, the manufacture is easily. The mechanical strength in the permanent magnet rotary machine is stronger than that of the prior art, as a result the wind loss in the permanent magnet rotary machine can be reduced and the efficiency in the permanent magnet rotary machine can be improved.

Hereinafter, a principle for generating the cogging torque of this kind of the permanent magnet rotary machine will be explained referring to FIG. 11. In general the cogging torque is induced by the change of the magnetic energy in the gap portion 5 in company with the move of the permanent magnet magnetic pole (b). A cause of the change in the magnetic energy resides the existence of a winding groove of the permanent magnet rotary machine.

Figure 11:
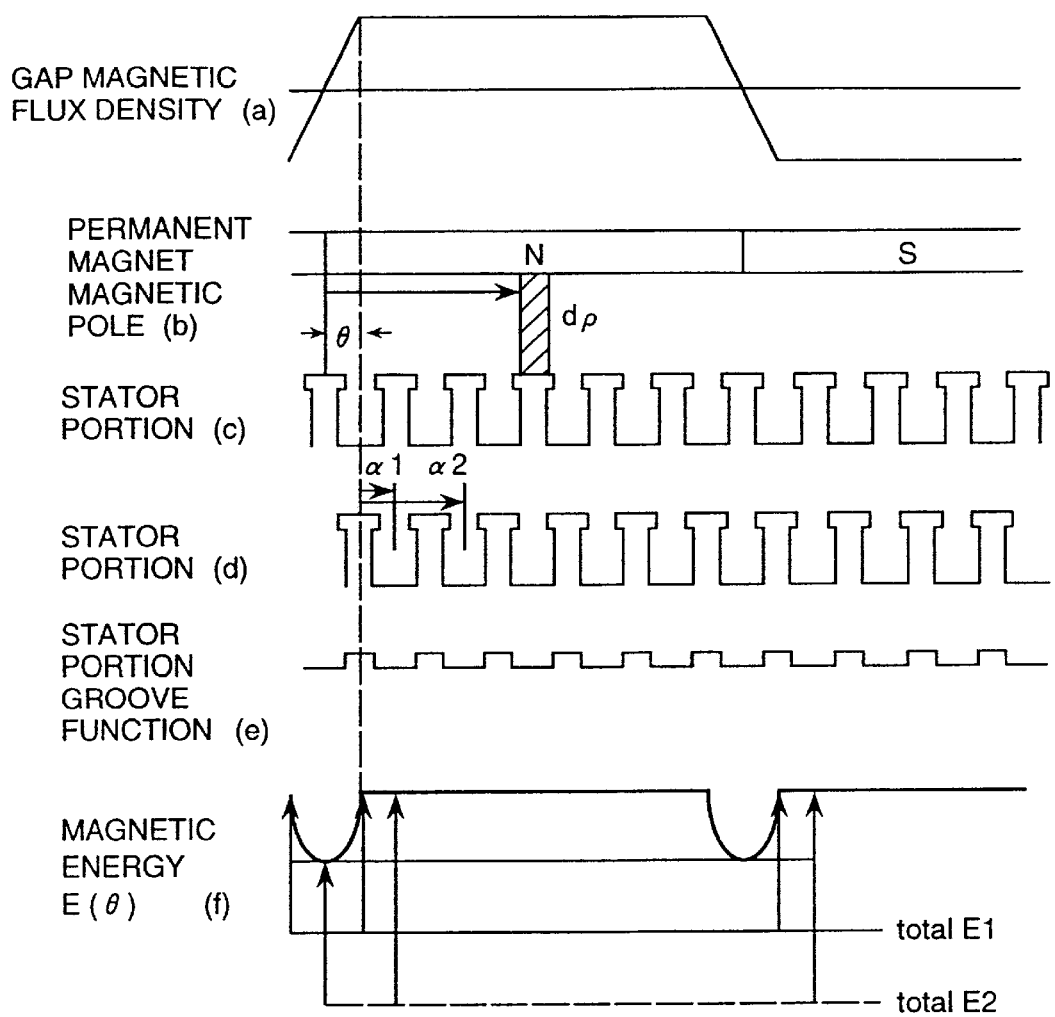
FIG. 11 is an explanation diagram view showing the principle of the generation of the cogging torque.

In FIG. 11, (a) shows a gap magnetic flux density, (c) shows a peripheral direction development figure of the stator portion, (d) shows the stator portion (c) in which the amateur portion is moved with θ. In this figure, for convenience's sake, reversibly against the actual fact, the stator portion (c) is moved against the permanent magnet magnetic pole (b), this will be explained as following.

In this figure, the cogging torque Tc of the permanent magnet rotor machine is expressed by a following formula (1), in a case where θ denotes the movement angle of the amateur portion (c) against the permanent magnet magnetic pole (b) and E(θ) denotes the magnetic energy of the whole gap 5.

$$T_c = -\frac{\partial E(\theta)}{\partial \theta} \quad (1)$$

On the other hand, the magnetic energy $\Delta E(\theta)$ per a minute physical constitution $d\phi$ at an optical angle in the gap is expressed as following formula (2), in a case where $\mu_0$ denotes an air permeability rate, $B_g(\phi, \theta)$ denotes a gap magnetic flux density, and $K_1$ denotes a constant.

$$\Delta E(\theta) = \frac{1}{2}\frac{1}{\mu_0}B_g^2(\phi, \theta)d\phi \quad (2)$$

$$= K_1 B_g^2(\phi, \theta)d\phi$$

Accordingly, the magnetic energy of the whole gap E(θ) is expressed by a following formula (3), in a case where P denotes a number of the permanent magnet magnetic poles.

$$E(\theta) = K_1 \int_0^{P \times} B_g^2(\phi, \theta) d\phi \quad (3)$$

In general in a case of no winding groove a gap magnetic flux density B(φ) is disposed to a high harmonic wave is expressed by a following formula (4), in a case where $B_n$ denotes a peak value of a high harmonic wave.

$$B(\theta) = \sum_{n=1}^{\infty} B_n \sin n\phi \qquad (4)$$

Further, a dimensional order number is defined by a following formula (5) (FIG. 11(f)), in a case where in the gap portion as an energy function $S(\phi)$, $S_n(\phi)$ denotes a high harmonic wave part of $S(\phi)$, $K_n$ denotes a direct current part of $S_n(\phi)$, and $S_{an}$ denotes a peak part of the high harmonic wave part.

$$\begin{aligned} S(\phi) &= B^2(\phi) \\ &= \sum_{n=1}^{\infty} S_n(\phi) \\ &= \sum_{n=1}^{\infty} (K_n + S_{an}\sin 2n\phi) \end{aligned} \qquad (5)$$

Herein, an affect of the winding groove against the magnetic flux density is considered that the gap magnetic flux density on the groove reduces or become zero. Accordingly, a following function in which only the position of the groove is made as a unit is defined a following formula (6a) and (6b), in which W denotes a width of the winding groove (FIG. 11(e)).

$$u(x) = 1 - \frac{W}{2} < x < \frac{W}{2} \qquad (6a)$$

$$u(x) = 0 \quad x < -\frac{W}{2}, \quad x > \frac{W}{2} \qquad (6b)$$

Using the above stated functions, the existence of the winding groove is expressed by a following $ut(\theta)$, in a case where the winding groove positions are $\alpha_1, \alpha_2 \ldots \alpha_n$, and $n_\alpha$ denotes a winding groove number.

$$\begin{aligned} ut(\phi) &= u(\phi + \alpha_1) + u(\theta + \alpha_2) + \ldots + u(\theta + \alpha_n) \\ &= \sum_{n=1}^{n\alpha} u(\theta + \alpha_n) \end{aligned} \qquad (7)$$

Accordingly, the distribution of the magnetic flux $B_g(\phi, \theta)$ including the winding groove is expressed by a following formula (8).

$$Bg(\phi,\theta) = (1 - ut(\theta))B(\phi) \qquad (8)$$

When the formula (8) is substituted to the formula (3), a following formula (9) is obtained.

$$\begin{aligned} E(\theta) &= K_1 \int_0^{Px} \{1 - ut(\theta)\}^2 B^2(\phi) d\phi \\ &= K_1 \int_0^{Px} \{1 - ut(\theta)\} B^2(\phi) d\phi \\ &= K_1 \int_0^{Px} B^2(\phi) d\phi - K_1 \int_0^{Px} B^2(\phi) ut(\theta) d\phi \end{aligned} \qquad (9)$$

Now, the first item of the formula (9) does not consisted as the function of $\theta$, as clearly shown in the formula (1) it does not give the affect to the cogging torque Tc. As a result, the cogging torque Tc is expressed by a following formula (10).

$$\begin{aligned} T_c &= K_1 \frac{\partial}{\partial \theta} \int_0^{Px} B^2(\phi) ut(\theta) d\phi \\ &= K_1 \frac{\partial}{\partial \theta} \int_0^{Px} S(\phi) ut(\theta) d\phi \end{aligned} \qquad (10)$$

$S(\theta)$ shows the energy function in a case of no existence of the winding groove and further this is expressed a following formula (11).

$$\int_0^{Px} S(\phi) ut(\theta) d\phi = W \sum_{n=1}^{n\alpha} S(\theta + \alpha_n) \qquad (11)$$

Accordingly, the cogging torque Tc will be explained referring to FIG. 11, the before the movement of the position relationship ((e) of FIG. 11) of the energy function $E(\phi)$ shown in (f) of FIG. 11 is expressed by the fluctuation of a total sum E1 of the energy function showing (c) of FIG. 11 and the energy function E2 showing the after movement showing (d) of FIG. 11.

From (f) in FIG. 11, it is difficult to find out directly the fluctuation, the formula (11) is developed further and a following formula (12) can be obtained.

$$\begin{aligned} \int_0^{Px} S(\phi) ut(\theta) d\phi &= \sum_{n=1}^{\infty} S_n(\phi) ut(\theta) \\ &= \sum_{n=1}^{\infty} S_n(\phi) \sum_{n_1=1}^{\infty} u(\theta + \alpha n_1) \\ &= \sum_{n=1}^{\infty} W \cdot \sum_{n_1=1}^{\infty} S_n(\theta + \alpha n_1) \\ &= \sum_{n=1}^{\infty} W \cdot \sum_{n=1}^{n\alpha} S_{an} \text{Sin} 2 \cdot n(\theta + \alpha n_1) \end{aligned} \qquad (12)$$

Therefore, in accordance with the above stated formula (12), the cogging torque Tc can be deposed with the respective harmonic wave component. This means that the respective harmonic wave components of the cogging torque Tc is given as the fluctuation of the sum of the winding groove position portion of the energy function of the same harmonic wave components.

With the above stated theory, in the permanent magnet rotary machine in which the cogging torque is generated, in this embodiment as shown in FIG. 1, the groove 10 is provided on the rotor iron core 7 and this groove 10 generates the reverse phase cogging torque having the same dimensional number to that of the cogging torque which generates between the permanent magnet 8 and the stator 1.

With this permanent magnet rotary machine construction, by the provision of the groove 10 provided on the rotor iron core 7, the cogging torque generated between the permanent magnet 8 and the stator 1 is reduced. In particularly, a big effect can be obtained in a case where the groove 10 is arranged to lessen the pulsation motion component $\Sigma B^2$ in the pulsation motion component of the cogging torque.

In an electric vehicle using the permanent magnet rotary machine as a drive motor, during the start time and the standstill time, the vibration is generated according to the cogging torque of the permanent magnet rotary machine. By the use of the permanent magnet rotary machine according to the present invention, the cogging torque of the permanent magnet rotary machine can reduced, the comfortable electric vehicle having the small vibration during the start time and the standstill time of the electric vehicle can be obtained.

Figure 12:
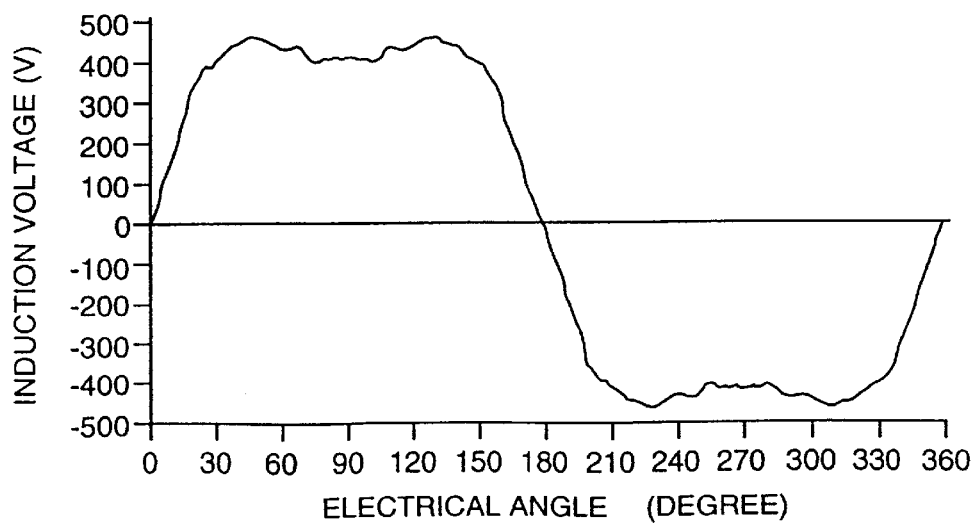
FIG. 12 is a graph showing the analysis value of the permanent magnet rotary machine in which the induced voltage waveform is a trapezoid shape according to the present invention.

On the other hand, since the groove 10 is provided on the surface of the rotor iron core 6, the gap portion 5 becomes non-uniformly, as a result the induced voltage waveform changes. In commonly, the induced voltage waveform forms the sine wave, however in a case where the groove is formed with the trapezoid shape wave, it can approach closer the peak value of the valid value of the induced voltage in comparison with the case of sine wave. As a result, the groove 10 is provided to form the induced voltage waveform to the trapezoid shape wave, so that the valid value of the induced voltage is made large, the high efficiency and the compact size permanent magnet rotary machine can be attained. The analysis value of the induced voltage waveform is shown in the graph in FIG. 12.

Figure 13:
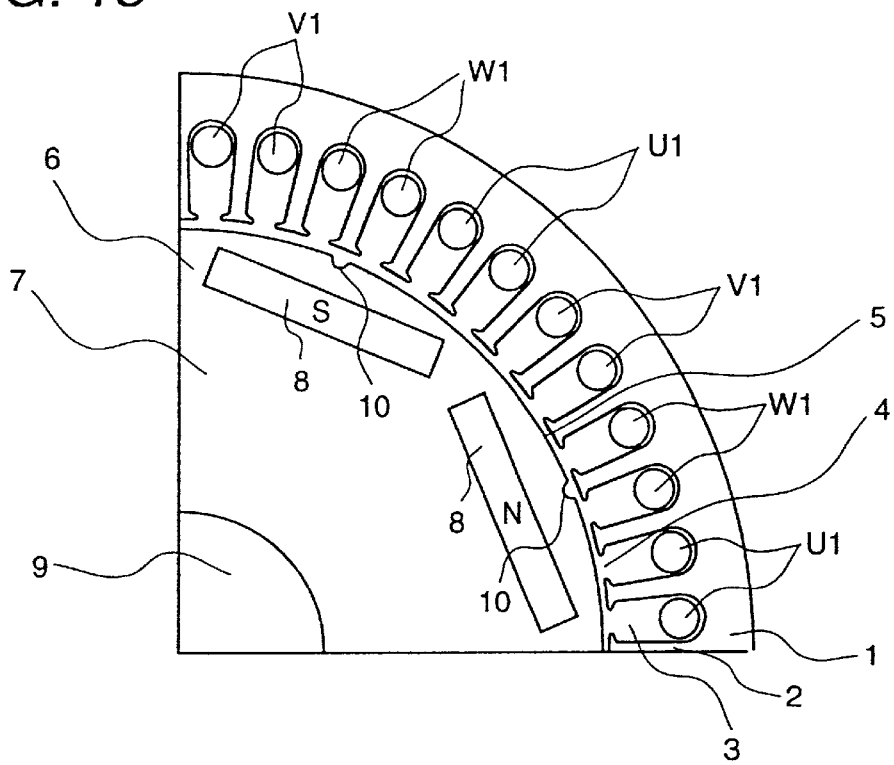
FIG. 13 is a view showing one pole pair of a permanent magnet rotary machine of a second embodiment according to the present invention.

Further, in the present invention, the shape of the permanent magnet is not limited to the arc shape shown in the first embodiment but also it can employ the various shapes. In FIG. 13, as a second embodiment of the permanent magnet rotary machine according to the present invention, the shape of permanent magnet 8 in the permanent magnet rotary machine has a block (rectangular) shape. In this second embodiment according to the present invention similarly to the first embodiment, by the provision of the groove 10 on the surface of the rotor iron core 6, the cogging torque can be reduced.

Figure 14:
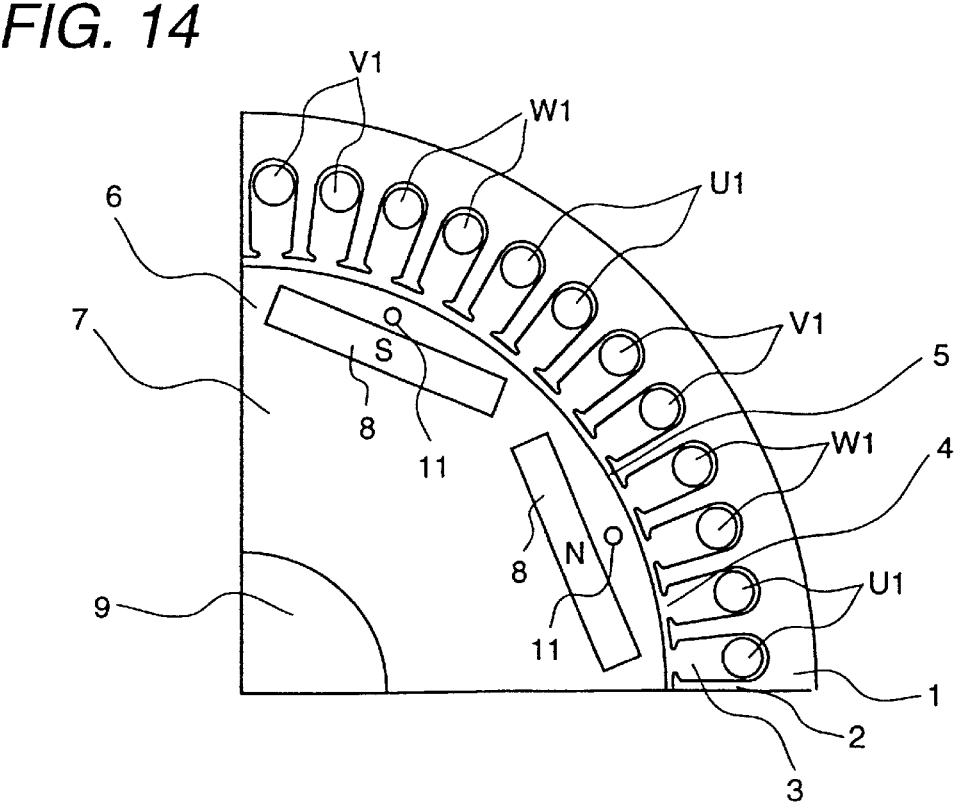
FIG. 14 is a view showing one pole pair of a permanent magnet rotary machine of a third embodiment according to the present invention.

Further, the magnetic fluctuation component can be existed on one except for the groove 10 on the surface of the rotor iron core 6 and it can be existed, for example on the inner portion of the rotor 7. In FIG. 14, as a third embodiment of the permanent magnet rotary machine according to the present invention, the magnetic fluctuation component is existed on a round shape punch-out hole 11 in the inner portion of the rotor 7. This hole 11 is provided in the rotor iron core 7 and is arranged between an outer peripheral portion of the rotor iron core 7 and the outer face of the circumferential direction width further this hole 11 8 is positioned to correspond to a center of the magnetic pole of the permanent magnet 8.

In this third embodiment according to the present invention, similarly to the above stated embodiments, the reduction effect of the cogging torque can be obtained. Further, the effect for reducing the wind-loss can be obtained.

Further, the shape of the punch-out hole 11, within a range for allowing the mechanical strength of the rotor 6 is not limited to the round shape but an oval shape and a block (rectangular) shape can be employed.

Further, the material of the permanent magnet can be employ one in addition to the neodymium made permanent magnet and further a number of the poles (the pole number) of the permanent magnet can be one in addition to 8 poles and further a slot number of the stator can employ one in addition to 48 numbers.

Further, the number of the groove 10 provided on the surface of the rotor iron core 6 can form plural per one pole toward the circumferential direction of the magnetic pole of the permanent magnet 8. Further, the depth of the groove 10 provided on the surface of the rotor iron core 6 toward the circumferential direction of the magnetic pole of the permanent magnet 8 can be made shallow in accordance with the increase of the groove number. Further, as the article which necessities the reduction of the cogging torque, other than the inner rotation type rotary machine and the outer rotation type rotary machine, a linear motor etc. can be applied.

Further, the number of the hole 11 provided on the rotor iron core 6 can form plural per one pole toward the circumferential direction of the magnetic pole of the permanent magnet 8. Further, the large size of the hole 11 provided on the rotor iron core 6 toward the circumferential direction of the magnetic pole of the permanent magnet 8 can be made small in accordance with the increase of the hole number.

Figure 15:
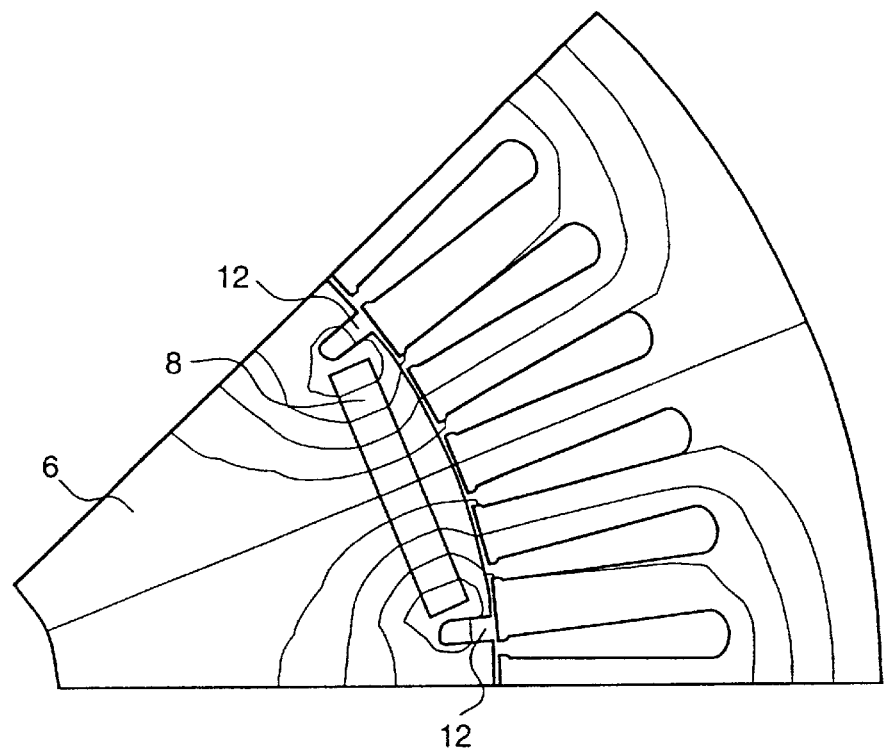
FIG. 15 is a view showing one pole pair of a permanent magnet rotary machine of a fourth embodiment according to the present invention.

As a fourth embodiment of the permanent magnet rotary machine according to the present invention, plural (two) grooves 12 are provided on both ends of the permanent magnet 8. The magnetic field analysis result in which two grooves 10 are arranged between the poles per one pole according to this fourth embodiment is shown in FIG. 15 and the cogging torque waveform of this case is shown in the graph in FIG. 16.

Figure 17:
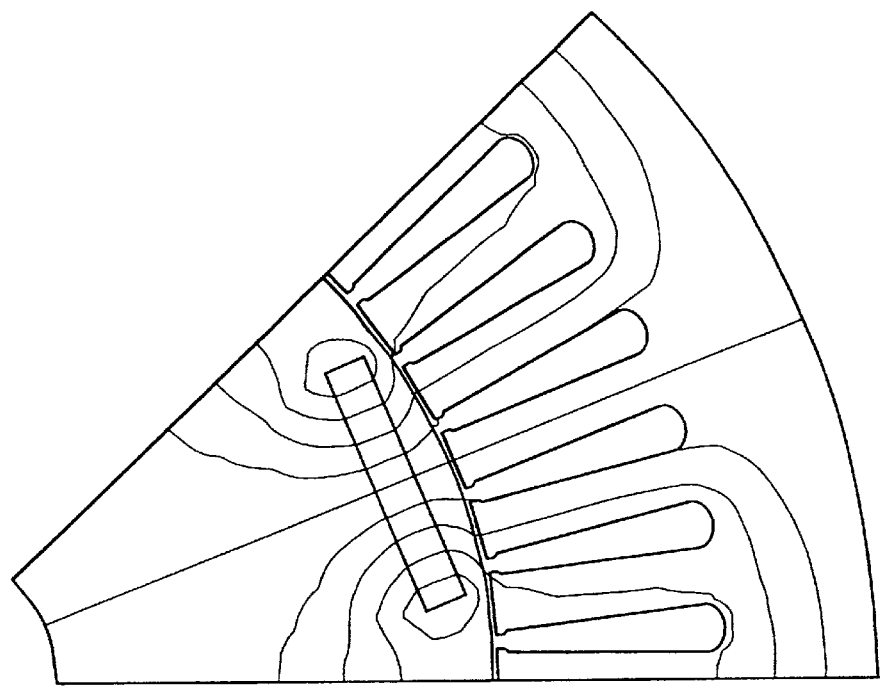
FIG. 17 is a view showing one pole pair of a permanent magnet rotary machine in a case of no provision of the groove according to the prior art.
Figure 18:
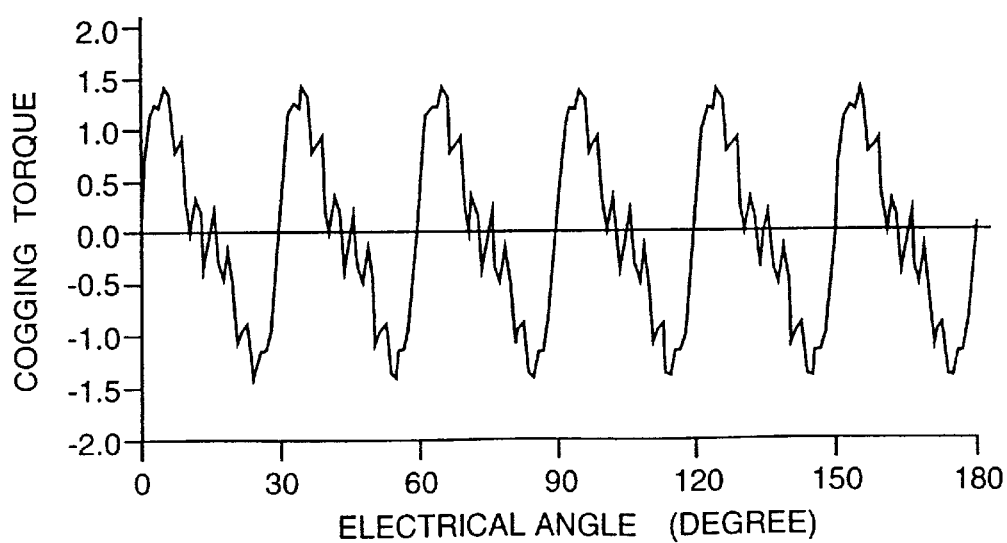
FIG. 18 is a graph showing the cogging torque in the configuration of the permanent magnet rotary machine according to the prior art shown in FIG. 17.

For the comparison with the fourth embodiment according to the present invention, as a case of no existence of the above stated grooves, the magnetic field analysis result is shown in FIG. 17 and the cogging torque waveform of this case is shown the graph in FIG. 18.

Figure 16:
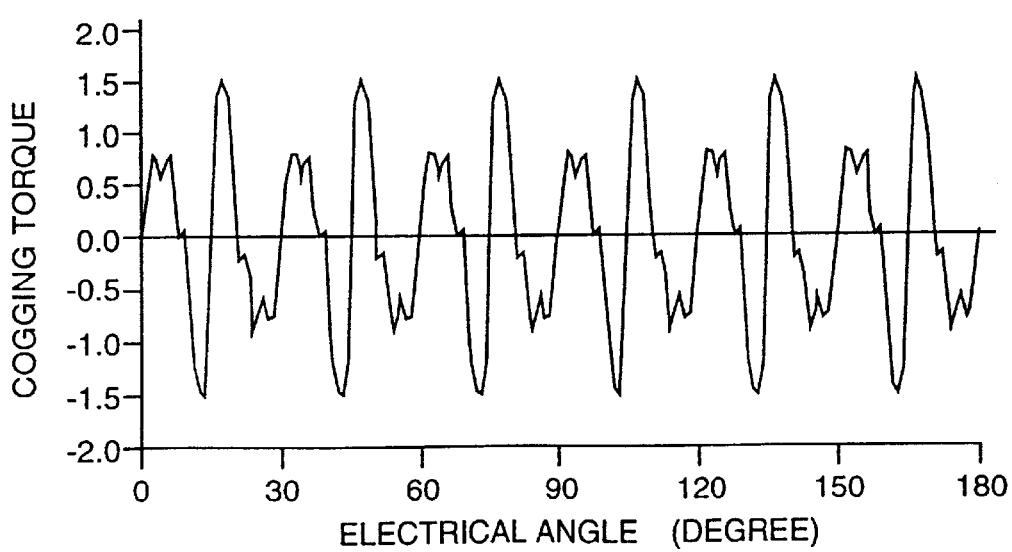
FIG. 16 is a graph showing the cogging torque in the configuration of the permanent magnet rotary machine according to the present invention shown in FIG. 15.

In the comparison FIG. 16 with FIG. 18, the cogging torque from the peak to the peak is hardly changed but as to one period of the waveform in FIG. 18 of the case of no groove the electrical angle is 30 degree, however in FIG. 16 of the provision of the grooves the electrical angle is 15 degree and is a half of that of the case of no groove. Since the frequency bound where the man can feel the bodily sensation is constant, by the provision of the grooves the frequency (the rotation number) for feeling the vibration becomes half. In originally the area where the vibration according to the cogging torque becomes a problem is an extremely low velocity area, further in the half velocity such a velocity becomes closely substantially zero.

In this fourth embodiment, namely plural grooves 12 are provided between both ends of the magnetic pole of permanent magnet 8, by making deep the grooves the leakage of the magnetic flux can be prevented effectively.

According to this fourth embodiment of the permanent magnet rotary machine, the grooves 12 are provided on the both sides of the permanent magnet 8, compared with the prior permanent magnet rotary machine in which the groove is provided on the permanent magnet, with the small size groove the cogging torque can be reduced.

According to the permanent magnet rotary machine of the present invention, since the groove or the hole is provided on the surface of the rotor iron core, in comparison with the permanent magnet rotary machine in which the groove is provided on the surface of the permanent magnet, with the small groove the cogging torque can be reduced effectively.

What is claimed is:

1. A permanent magnet rotary machine, comprising a stator having a stator winding, and a rotor arranged rotatively in an inner periphery of said stator through a rotation air space and in which plural permanent magnets are buried with a circumferential shape in an inner portion of an iron core, said respective permanent magnet has one permanent magnet selected from one of a block shape permanent magnet, a trapezoid shape permanent magnet and an arc shape permanent magnet in which a convex portion of said permanent magnet directs for a side of said stator, wherein at least one groove is provided on a portion between an outer face in a peripheral direction width of said permanent magnet and an outer peripheral portion of said iron core, and said groove generates a magnetic fluctuation for reducing a cogging torque which is generated during rotation of said rotor.

2. An electric vehicle having a drive use motor, wherein as said drive use motor, a permanent magnet type rotary machine as defined in claim 1 is used.

3. A permanent magnet rotary machine, comprising a stator having a stator winding, and a rotor arranged rotatively in an inner periphery of said stator through a rotation air space and in which plural permanent magnets are buried with a circumferential shape in an inner portion of an iron core, said respective permanent magnet has one permanent magnet selected from one of a block shape permanent magnet, a trapezoid shape permanent magnet and an arc shape permanent magnet in which a convex portion of said permanent magnet directs for a side of said stator, wherein at least one groove is provided on an outer peripheral portion of said iron core and a position between adjacent said permanent magnets, and said groove generates a magnetic fluctuation for reducing a cogging torque which is generated during rotation of said rotor.

4. An electric vehicle having a drive use motor, wherein as said drive use motor, a permanent magnet type rotary machine as defined in claim 3 is used.

5. A permanent magnet rotary machine, comprising a stator having a stator winding, and a rotor arranged rotatively in an inner periphery of said stator through a rotation air space and in which plural permanent magnets are buried with a circumferential shape in an inner portion of an iron core, said respective permanent magnet has one permanent magnet selected from one of a block shape permanent magnet, a trapezoid shape permanent magnet and an arc shape permanent magnet in which a convex portion of said permanent magnet directs for a side of said stator, wherein at least one groove is provided on a portion between an outer face in a peripheral direction width of said permanent magnet of an outer peripheral portion of said iron core, said groove generates a magnet fluctuation for reducing a cogging torque which is generated during rotation of said rotor and further said groove is provided to form a waveform of an induced voltage to a substantial trapezoid shape waveform.

6. An electric vehicle having a drive use motor, wherein as said drive use motor, said permanent magnet type rotary machine defined in claim 5 is used.

* * * * *